(12) United States Patent
Park et al.

(10) Patent No.: US 11,800,564 B2
(45) Date of Patent: Oct. 24, 2023

(54) METHOD AND APPARATUS FOR RANDOM ACCESS LAYERED PREAMBLES

(71) Applicant: ELECTRONICS AND TELECOMMUNICATIONS RESEARCH INSTITUTE, Daejeon (KR)

(72) Inventors: Gi Yoon Park, Daejeon (KR); Seok Ki Kim, Daejeon (KR); Ok Sun Park, Daejeon (KR); Eun Jeong Shin, Daejeon (KR); Jae Sheung Shin, Daejeon (KR); Jin Ho Choi, Vic (AU)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 180 days.

(21) Appl. No.: 17/389,652

(22) Filed: Jul. 30, 2021

(65) Prior Publication Data
US 2022/0046713 A1 Feb. 10, 2022

(30) Foreign Application Priority Data

Aug. 10, 2020 (KR) .................. 10-2020-0099838
Jul. 16, 2021 (KR) .................. 10-2021-0093563

(51) Int. Cl.
H04W 74/08 (2009.01)
H04J 13/22 (2011.01)
H04J 13/14 (2011.01)

(52) U.S. Cl.
CPC ......... H04W 74/0833 (2013.01); H04J 13/14 (2013.01); H04J 13/22 (2013.01)

(58) Field of Classification Search
None
See application file for complete search history.

(56) References Cited

U.S. PATENT DOCUMENTS 8,773,968 B2 * 7/2014 Jiang .................. H04J 13/0074
370/252
9,774,424 B2 * 9/2017 Jiang .................. H04L 27/2613
(Continued)

FOREIGN PATENT DOCUMENTS

KR 10-2009-0020756 A 2/2009
KR 10-2009-0129325 A 12/2009

OTHER PUBLICATIONS

R2-2001125, 3GPP TSG-RAN WG2 #109-e, NEC, "Preamble grouping for 2-step RA". Feb. 24-Mar. 6, 2020 (Year: 2020).*
(Continued)

Primary Examiner — Faiyazkhan Ghafoerkhan
(74) Attorney, Agent, or Firm — LRK PATENT LAW FIRM

(57) ABSTRACT

An operation method of a terminal in a communication system may include: receiving, from a base station, quality of service (QoS) information for preamble groups and information on preambles belonging to each of the preamble groups; selecting one preamble group from among the preamble groups based on the QoS information and a QoS of the terminal; selecting a preamble within the one preamble group based on the information on preambles belonging to each of the preamble groups; transmitting a first message including the selected preamble to the base station; and receiving, from the base station, a second message that is a response to the first message.

17 Claims, 6 Drawing Sheets

(56) References Cited

U.S. PATENT DOCUMENTS

| | | | |
|---|---|---|---|
| 9,907,093 B2* | 2/2018 | Park | H04W 74/0833 |
| 10,334,632 B2* | 6/2019 | Hwang | H04W 74/0833 |
| 11,343,737 B2* | 5/2022 | Park | H04W 80/08 |
| 11,363,480 B2* | 6/2022 | Yi | H04L 5/0048 |
| 11,483,839 B2* | 10/2022 | Chae | H04W 72/02 |
| 2009/0046629 A1* | 2/2009 | Jiang | H04J 13/0059 |
| | | | 370/328 |
| 2009/0073944 A1* | 3/2009 | Jiang | H04J 11/00 |
| | | | 370/338 |
| 2014/0341010 A1* | 11/2014 | Jiang | H04L 27/2607 |
| | | | 370/208 |
| 2014/0347985 A1* | 11/2014 | Yi | H04W 76/10 |
| | | | 370/230 |
| 2017/0223732 A1* | 8/2017 | Bertrand | H04W 40/08 |
| 2018/0131481 A1* | 5/2018 | Jiang | H04L 27/2601 |
| 2019/0174551 A1* | 6/2019 | Liu | H04L 5/0053 |
| 2019/0364599 A1* | 11/2019 | Islam | H04L 5/0048 |
| 2020/0022187 A1* | 1/2020 | Bergström | H04W 48/16 |
| 2020/0053790 A1* | 2/2020 | Shin | H04W 74/008 |
| 2020/0236716 A1* | 7/2020 | Lei | H04L 5/0044 |
| 2020/0252847 A1* | 8/2020 | Park | H04W 36/08 |
| 2020/0252962 A1* | 8/2020 | Vajapeyam | H04W 74/0833 |
| 2020/0359247 A1* | 11/2020 | Yi | H04W 24/10 |
| 2021/0105787 A1* | 4/2021 | Park | H04L 43/16 |
| 2021/0212122 A1* | 7/2021 | Cho | H04W 72/12 |
| 2021/0385879 A1* | 12/2021 | Mahalingam | H04W 72/1263 |
| 2022/0046713 A1* | 2/2022 | Park | H04L 5/0053 |
| 2022/0124826 A1* | 4/2022 | You | H04W 74/0833 |
| 2023/0068789 A1* | 3/2023 | Christoffersson | |
| | | | H04W 74/0833 |

OTHER PUBLICATIONS

Spreadtrum Communications, "Remaining issues on channel structure for 2-step RACH", 3GPP TSG RAN WG1#102, R1-2006284, E-Meeting, Aug. 17-Aug. 28, 2020.

Jinho Choi, "NOMA-Based Compressive Random Access Using Gaussian Spreading", IEEE Transactions on Communications, vol. 67, No. 7, Jul. 2019.

* cited by examiner

METHOD AND APPARATUS FOR RANDOM ACCESS LAYERED PREAMBLES

CROSS-REFERENCE TO RELATED APPLICATIONS

This application claims priority to Korean Patent Applications No. 10-2020-0099838 filed on Aug. 10, 2020 and No. 10-2021-0093563 filed on Jul. 16, 2021 with the Korean Intellectual Property Office (KIPO), the entire contents of which are hereby incorporated by reference.

BACKGROUND

1. Technical Field

The present disclosure relates to a random access technique, and more specifically, to a random access technique using layered preambles, which enables control of a collision possibility and a reception error rate according to a quality requirement of a terminal.

2. Description of Related Art

With the development of information and communication technology, various wireless communication technologies have been developed. As a representative wireless communication technology, there may be long term evolution (LTE), new radio (NR), or the like defined as the 3rd generation partnership project (3GPP) specification. The LTE may be one of 4th generation (4G) wireless communication technologies, and the NR may be one of $5^{th}$ generation (5G) wireless communication technologies.

In order to process wireless data that increases rapidly after commercialization of the 4G communication system (e.g., LTE communication system), a 5G communication system (e.g., NR communication system) using not only a frequency band (e.g., frequency band of 6 GHz or below) of the 4G communication system but also a frequency band (e.g., frequency band of 6 GHz or above) higher than the frequency band of the 4G communication system may be considered. The 5G communication system may support enhanced Mobile BroadBand (eMBB), Ultra-Reliable and Low Latency Communication (URLLC), and massive Machine Type Communication (mMTC).

In such a wireless communication technology, a terminal may randomly select a preamble and attempt random access to a base station. Accordingly, a collision may occur when several terminals attempt to access the base station using the same single preamble. In order to solve such the problem, a method may be used in which the base station controls a range of available resources according to a quality of service (QoS) of the terminal on the premise of uniform preamble resources. However, through this method, the base station may reduce the possibility of collision between the terminals requiring a high quality, but may not lower a reception error rate after avoiding the collision.

SUMMARY

Accordingly, exemplary embodiments of the present disclosure are directed to providing a method and an apparatus for random access using layered preambles, which can reduce a possibility of collision for a terminal requiring a high quality and can lower a reception error rate after avoiding occurrence of a collision.

According to a first exemplary embodiment of the present disclosure, an operation method of a terminal in a communication system may comprise: receiving, from a base station, quality of service (QoS) information for preamble groups and information on preambles belonging to each of the preamble groups; selecting one preamble group from among the preamble groups based on the QoS information and a QoS of the terminal; selecting a preamble within the one preamble group based on the information on preambles belonging to each of the preamble groups; transmitting a first message including the selected preamble to the base station; and receiving, from the base station, a second message that is a response to the first message.

The preamble groups may include a first preamble group and a second preamble group generated by dividing an original preamble group consisting of constant amplitude zero autocorrelation (CAZAC) sequences having a prime sequence length based on cross-correlation, and a cross-correlation of preambles belonging to the first preamble group may be smaller than a cross-correlation of preambles belonging to the second preamble group.

The CAZAC sequence may be a Zadoff-Chu sequence, and the prime sequence length may be one of 389 and 139.

The operation method may further comprise receiving information on transmit powers for the preamble groups, wherein the selected preamble is transmitted using a transmit power according to the information on the transmit powers.

The preamble groups may include a first preamble group for first-type terminals whose required latency is less than a threshold and a second preamble group for second-type terminals whose required latency is equal to or greater than the threshold, and a transmit power for the first preamble group may be greater than a transmit power for the second preamble group.

The operation method may further comprise receiving, from the base station, configuration information of a random access channel (RACH) occasion bundle and a number of RACH occasions included in the RACH occasion bundle, wherein the selected preamble is transmitted in a RACH occasion indicated by the configuration information.

The first message may be MsgA and the second message may be MsgB.

According to a second exemplary embodiment of the present disclosure, an operation method of a base station in a communication system may comprise: configuring preamble groups, preambles belonging to each of the preamble groups, and a QoS of each of the preamble groups; transmitting preamble group configuration information to a terminal, the preamble group configuration information including information on the preamble groups, information on the preambles belonging to each of the preamble groups, and QoS information on the QoS of each of the preamble groups; receiving, from the terminal, a first message including a preamble selected based on the preamble group configuration information and a QoS of the terminal; detecting the preamble in the first message; and transmitting, to the terminal, a second message that is a response to the first message.

The configuring may comprise: generating an original preamble group having constant amplitude zero autocorrelation (CAZAC) sequences having a prime sequence length as member preambles; allocating the preambles in the original preamble group as the preambles belonging to the preamble groups; and configuring the QoS for each of the preamble groups.

The allocating of the preambles may comprise: excluding preambles having a cross-correlation greater than or equal to a first threshold from the original preamble group; calculating cross-correlations of preambles remaining in the original preamble group; and allocating the remaining preambles to the preamble groups based on the calculated cross-correlations.

The configuring of the QoS for each of the preamble groups may comprise configuring QoS levels according to various QoS thresholds; and mapping the QoS level to each of the preamble groups.

The configuring of the QoS for each of the preamble groups may comprise configuring the QoS for each of the preamble groups by using a QoS specifier(s) indicating a preamble group(s) that the base station is able to select.

The detecting of the preamble in the first message may comprise: calculating cross-correlations by applying a preamble matrix of one preamble group to a received signal matrix of the first messages received from a plurality of terminals including the terminal; detecting preambles belonging to the one preamble group using the calculated cross-correlations; removing received signals corresponding to the detected preambles from the received signal matrix; and detecting the preamble in the first message by detecting preambles belonging to the remaining preamble groups in the received signal matrix from which the received signals are removed.

According to a third exemplary embodiment of the present disclosure, a terminal may comprise a processor, a memory electronically communicating with the processor, and instructions stored in the memory, wherein when executed by the processor, the instructions cause the terminal to: receive, from a base station, quality of service (QoS) information for preamble groups and information on preambles belonging to each of the preamble groups; select one preamble group from among the preamble groups based on the QoS information and a QoS of the terminal; select a preamble within the one preamble group based on the information on preambles belonging to each of the preamble groups; transmit a first message including the selected preamble to the base station; and receive, from the base station, a second message that is a response to the first message.

The preamble groups may include a first preamble group and a second preamble group generated by dividing an original preamble group consisting of constant amplitude zero autocorrelation (CAZAC) sequences having a prime sequence length based on cross-correlation, and a cross-correlation of preambles belonging to the first preamble group may be smaller than a cross-correlation of preambles belonging to the second preamble group.

The instructions may further cause the terminal to receive information on transmit powers for the preamble groups, wherein the selected preamble is transmitted using a transmit power according to the information on the transmit powers.

The instructions may further cause the terminal to receive, from the base station, configuration information of a random access channel (RACH) occasion bundle and a number of RACH occasions included in the RACH occasion bundle, wherein the selected preamble is transmitted in a RACH occasion indicated by the configuration information.

The base station may configure preambles reflecting various QoS levels of the terminals and provide them to the terminals. In addition, each of the terminals may select a preamble according to a desired QoS level among the preambles reflecting the various QoS levels, and transmit the selected preamble to the base station to attempt random access. In addition, capacity of random access can be increased by allowing the base station to configure the preambles according to the various QoS levels and use them for random access of the terminals. In addition, since the base station configures the preambles according to various QoS levels and each terminal uses a preamble corresponding to its desired QoS level, it is made possible to reduce a possibility of preamble collision for a terminal requiring a high QoS level. In addition, since the base station configures the preambles capable of accommodating various QoS levels and provides them to the terminals, it is made possible to reduce a reception error rate after avoiding the collision of the preambles.

DETAILED DESCRIPTION OF THE EMBODIMENTS

Figure 1:
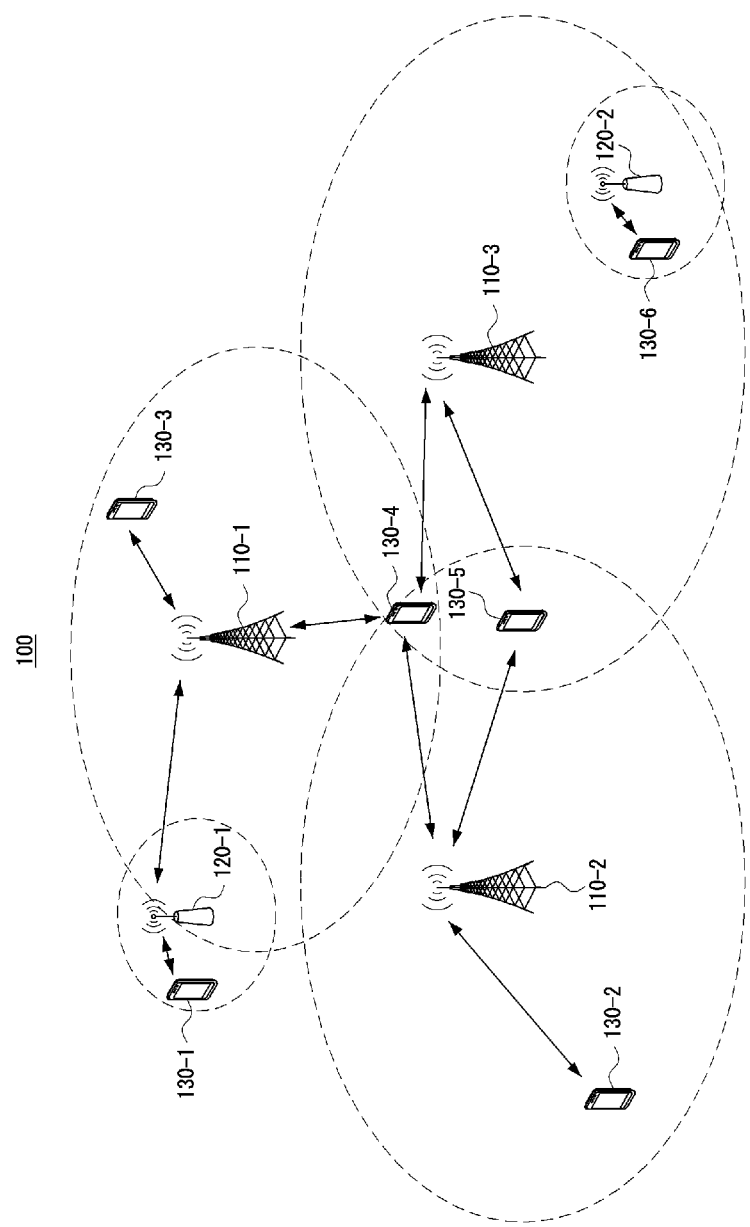
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support at least one communication protocol. For example, each of the plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
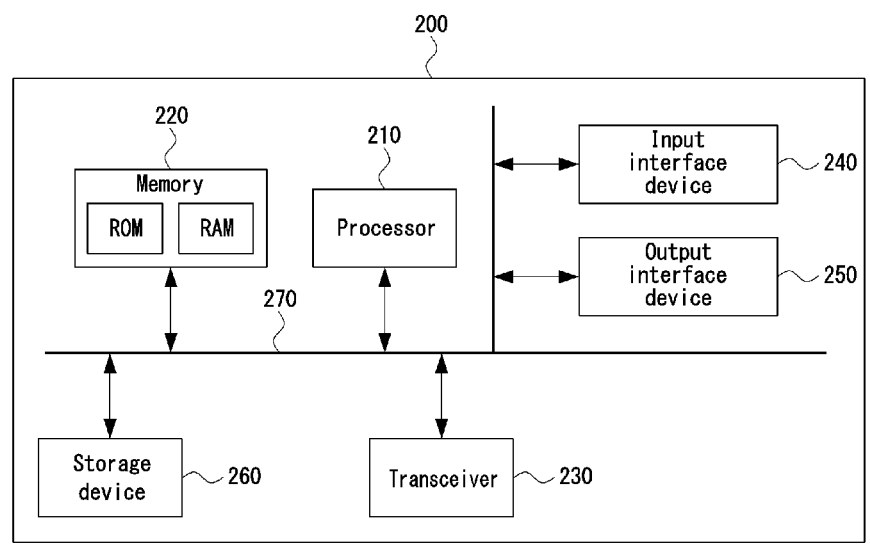
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each of the components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, in such a communication system, the terminal may randomly select a preamble and attempt random access to the base station. Accordingly, a collision may occur when several terminals access the base station using the same single preamble. When the preamble collision occurs like this, the base station may have difficulty in receiving the preamble. In order to solve this problem, the base station may reduce possibility of collision by increasing the number of preambles. However, if the length of the preamble is constant, correlation also increases according to the number of preambles, and a quality of a signal received by the base station may be deteriorated due to the increased number of preambles. Moreover, when a quality of service (QoS) required by the terminal varies, the base station may operate limited preamble resources in accordance with the required QoS. In this regard, a method may be used in which the base station controls a range of available resources according to a QoS required by the terminal on the premise of uniform preamble resources. However, through this method, the base station may reduce the possibility of collision for the terminal requiring a high quality, but may not lower a reception error rate after avoiding the collision. Accordingly, in the communication system, there may be a need for a random access method and apparatus using layered preambles that can reduce the possibility of collision for the terminal requiring a high quality and reduce a reception error rate after avoiding collision at the same time.

Meanwhile, for convenience of description, two QoS levels may be assumed. However, the QoS levels may be extended to multiple levels more than two. A parameter for QoS may include a latency. Accordingly, the QoS may be classified into a QoS level 1 for guaranteeing a short latency and a QoS level 2 for allowing a relatively long latency. Here, the short latency may refer to a latency of less than 1 ms, and the long latency may refer to a latency of 1 ms or more. Accordingly, there may be first-type terminals requiring the short latency for which the QoS level 1 should be satisfied, and there may be second-type terminals allowing the long latency for which the QoS level 2 is satisfied.

Figure 3:
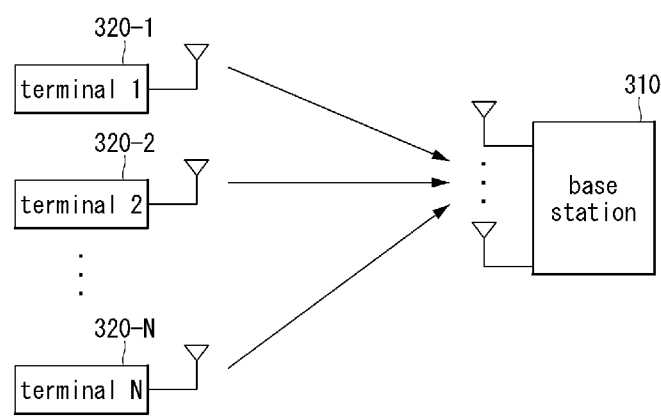
FIG. 3 is a conceptual diagram illustrating a second exemplary embodiment of a communication system.

FIG. 3 is a conceptual diagram illustrating a second exemplary embodiment of a communication system.

Referring to FIG. 3, a communication system may include a base station 310 and N terminals 320-1 to 320-N. Here, the base station 310 may have M receive antennas, and each of the terminals 320-1 to 320-N may have one transmit antenna. The N terminals 320-1 to 320-N may transmit preambles and data to the base station 320 in synchronization. Here, N may be less than or equal to M. N and M may be natural numbers. As such, the communication system may be composed of the base station 310 and a large number of terminals 320-1 to 320-N synchronized with the base station 310. Some terminals among the large number of terminals 320-1 to 320-N may be intermittently activated to transmit data to the base station 310 through random access procedures. The random access procedure may be started when the activated terminal transmits a preamble signal. In addition, the base station 310 may detect the preamble signal by receiving the preamble signal transmitted by the activated terminal. The base station 310 may transmit a random access response to the activated terminal according to the detected preamble. In the random access procedure, several terminals may select the same preamble, and transmit the same preamble signal to the base station 310. As such, when several terminals select the same preamble and transmit the same preamble signal, the base station 310 may not distinguish each of the several terminals, and the random accesses of the terminals may fail. When the base station 310 allocates a unique preamble to each of all the terminals 320-1 to 320-N, the possibility of collision may be avoided. However, in a machine type communication (MTC) application, there may be very many terminals 320-1 to 320-N, and if a unique preamble is allocated to each of all the terminals 320-1 to 20-N, the corresponding signal space may become excessively large. In this case, if a ratio of activated terminals is small compared to the number of all the terminals 320-1 to 320-N, the base station 310 may control the possibility of collision even when the preamble is shared.

In general, an efficiency of a power amplifier may increase as a peak-to-average power ratio (PAPR) of the preamble signal transmitted by the terminal decreases. In addition, if a signal space is configured so that the preamble signals transmitted by the terminals are orthogonal to each other, the base station may use a linear reception apparatus. Such the characteristics of the preamble signal may be called constant amplitude zero autocorrelation (CAZAC), and a Zadoff-Chu sequence, Alltop sequence, and the like may satisfy such the characteristics. For example, a sequence s having a sequence length of $L_{RA}$ that is a prime number may be defined as in Equation 1 below. Here, $L_{RA}$ may be one of 389 and 139. Here, u may be a root sequence index, and may be an integer. $1 \leq u < L_{RA}$ may be established. v may be a cyclic shift value. In addition, n may be a sample index, and may be an integer. $0 \leq n < L_{RA}$ may be established.

$$s_{u,v}(n) = x_u(\mathrm{mod}(n+v, L_{RA}))$$ [Equation 1]

$$x_u(n) = \frac{1}{\sqrt{L_{RA}}} \exp\left(-j2\pi \frac{u}{L_{RA}} \frac{n(n+1)}{2}\right),$$

$$0 \leq n < L_{RA},\ 1 \leq u < L_{RA}$$

$$\sum_{n=0}^{L_{RA}-1} s_{u,v}(n) s_{u',v'}^*(n) = \begin{cases} 1, & u = u',\ v = v' \\ 0, & u = u',\ v \neq v' \\ \frac{1}{\sqrt{L_{RA}}}, & u \neq u' \end{cases}$$

Figure 4:
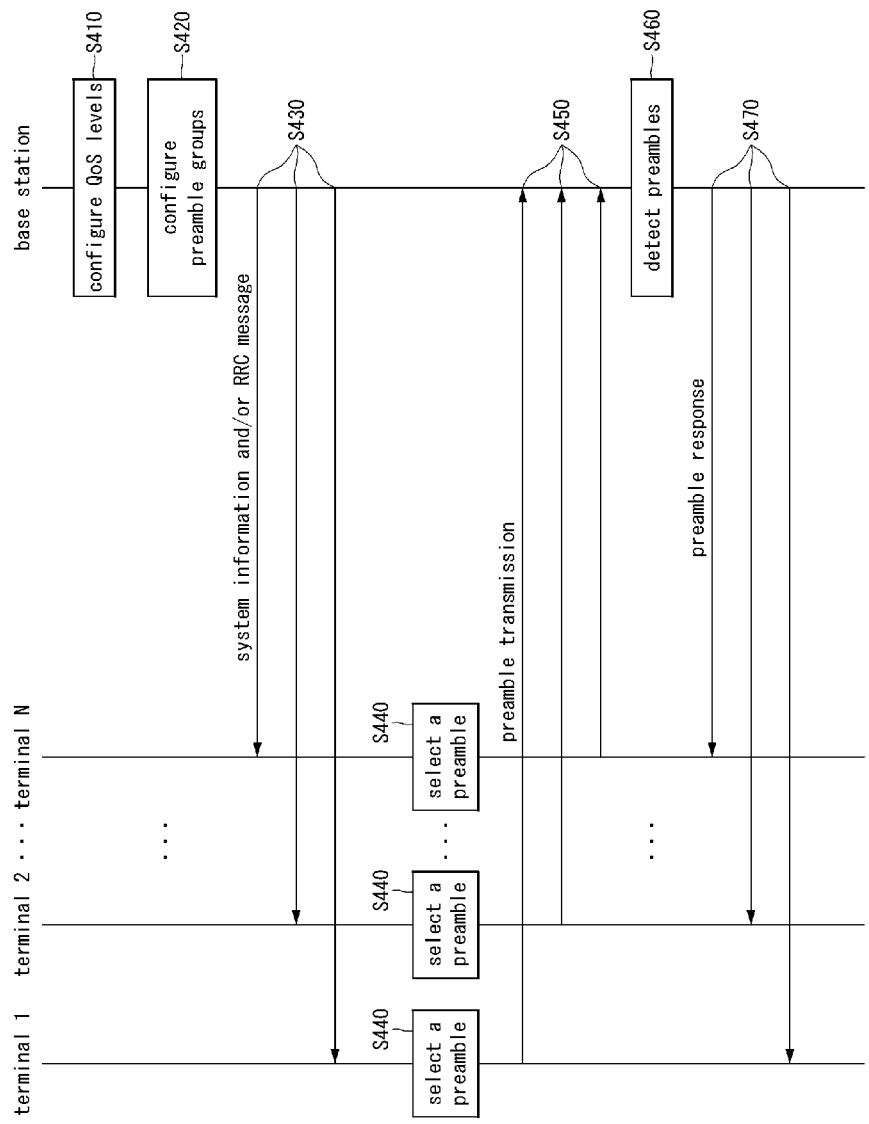
FIG. 4 is a sequence chart illustrating a first exemplary embodiment of a random access method using layered preambles.

FIG. 4 is a sequence chart illustrating a first exemplary embodiment of a random access method using layered preambles.

Referring to FIG. 4, in a random access method using layered preambles, the base station may configure QoS levels (S410). For example, the base station may configure 2 QoS levels. However, the QoS levels may be extended to several stages. A parameter for defining such the QoS level may include a latency. Accordingly, the base station may configure a QoS level 1 for guaranteeing a short latency and a QoS level 2 for allowing a relatively long latency. Here, the short latency may refer to a latency less than 1 ms, and the long latency may refer to a latency of 1 ms or more. Then, the base station may configure preamble groups (S420). In addition, the base station may map each of the configured preamble groups to a corresponding QoS level.

Figure 5:
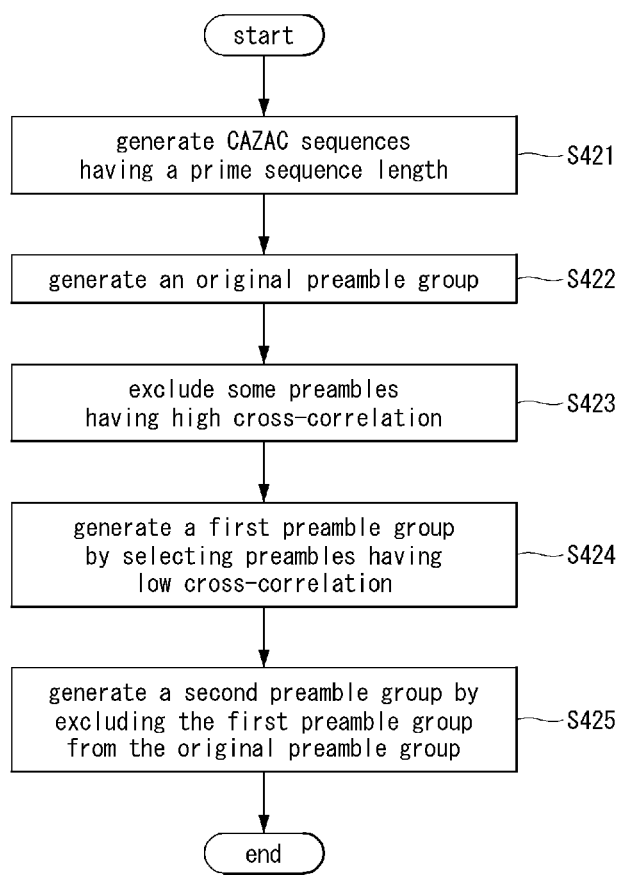
FIG. 5 is a flowchart illustrating a first exemplary embodiment of a procedure of configuring preamble groups in FIG. 4.

FIG. 5 is a flowchart illustrating a first exemplary embodiment of a procedure of configuring preamble groups in FIG. 4.

Referring to FIG. 5, in the procedure of configuring the preamble groups, the base station may generate CAZAC sequences each having a length of $L_{RA}$ that is a prime number according to Equation 1 (S421). In addition, the base station may generate an original preamble group using the generated CAZAC sequences as member preambles. Here, the number of preambles constituting the original preamble group may be $(L_{RA}-1)L_{RA}$. For example, if the prime number (i.e., $L_{RA}$) is 839, the number of preambles constituting the original preamble group may be 838× 839=703,082. In addition, the original preamble group may be expressed as a set $E_0$ when the prime number (i.e., $L_{RA}$) is 839, and may be defined as in Equation 2 below.

$$E_0 = \{(u, v) | 1 \leq u < L_{RA},\ 0 \leq v < L_{RA}\}$$ [Equation 2]

Then, the base station may exclude some preambles with high cross-correlation from the preambles constituting the original preamble group (S423). That is, the base station may calculate cross-correlations for the $(L_{RA}-1)L_{RA}$ preambles included in the original preamble group, and exclude preambles corresponding to the calculated cross-correlation value being equal to or greater than a first threshold from the original preamble group. Here, the first threshold may be a value preset in the base station by an administrator. In particular, when a Doppler shift occurs because the terminal moves at a high speed, or when a delay spread occurs because a signal transmitted from the terminal arrives at the base station through multiple paths, interference between preambles having adjacent cyclic shifts may increase, and correlation therebetween may increase. The base station may exclude some preambles whose cross-correlation may exceed the first threshold by subsampling cyclic shifts v from the original preamble group at an interval of $N_{CS}$. In this case, when the subsampling interval $N_{CS}$ is 22, the base station may express a subsampled original preamble group including the preambles subsampled according to $N_{CS}$ as a set $E_1$, and $E_1$ may be expressed as Equation 3 below. Here, k may mean the number of samples, the prime number $L_{RA}$ may be 839, and when the subsampling interval $N_{CS}$ is 22, k may be 39 or less. The set $E_1$ may have 838×39=32,682 elements.

$$E_1 = \{(u, N_{CS}k) | 1 \leq u < L_{RA},\ 0 \leq k < 39\} \subset E_0$$ [Equation 3]

Then, the base station may generate a first preamble group by selecting $L_1$ preambles having low cross-correlation from the original preamble group including the subsampled preambles remaining from the $(L_{RA}-1)L_{RA}$ preambles (S424). That is, the base station may generate the first preamble group by selecting preambles having a cross correlation equal to or less than a second threshold from the original preamble group including the subsampled preambles remaining from the $(L_{RA}-1)L_{RA}$ preambles. Here, the preambles of the first preamble group may be preambles suitable for use by the first-type terminals. As such, the base station may use the second threshold as a criterion for selecting some preambles with low cross-correlation from the original preamble group. As an example, when the second threshold is 0, an orthogonal preamble group may be formed by taking cyclic shifts v from preambles having a sample index n of 0 so that the number k of samples becomes 39. Alternatively, by allowing a higher second threshold, cyclic shifts v in the preambles having a sample index n of 1 may be added so that the number k of samples becomes 25 and the first preamble group having $L_1=64$ is generated. In this case, the first preamble group generated in this manner may be expressed as a set $E_2$, and $E_2$ may be configured as shown in Equation 4.

$$E_2 = \{(u, N_{CS}k) | 1 \leq u < L_{RA}, 0 \leq k < 39, 0 \leq k+39u < 64\} \subset E_1 \quad \text{[Equation 4]}$$

Then, the base station may generate a second preamble group by excluding the first preamble group from the original preamble group (S425). That is, the base station may generate the second preamble group (i.e., set $E_3$) by excluding the first preamble group (i.e., set $E_2$) from the original preamble group (i.e., $E_1$) from which some preambles have been removed. In this case, the set $E_3$ may be expressed as in Equation 5 below.

$$E_3 = E_1 \backslash E_2 \subset E_1 \quad \text{[Equation 5]}$$

Meanwhile, the 3GPP NR specification may designate up to two groups (i.e., A/B) of preambles. In addition, the terminal may select a group based on reference signal received power (RSRP) measurement and the size of a message (i.e., MsgA). However, the 3GPP NR specification divides up to 64 preambles into two groups and uses them, which may be insufficient to support the preambles allocated to the second-type terminal. Accordingly, the base station may newly define the second preamble group composed of $L_2$ preambles. Configuration information on the second preamble group may include the number $L_2$ of preambles, information of a power offset with respect to the existing groups A/B, and a determination criterion according to a message urgency. For example, the base station may designate a maximum ratio for determining $L_2$. In addition, the base station may set the power offset to a value of 0 dB or less.

Referring again to FIG. 4, the base station may transmit system information and/or a radio resource control (RRC) message including preamble group configuration information to the terminals (S430). Accordingly, the terminals may receive the system information and/or RRC message including the preamble group configuration information from the base station. Here, the preamble group configuration information may include information on the configured preamble groups and QoS information indicating a QoS required by each of the configured preamble groups. In addition, the preamble group configuration information may include configuration information of transmit powers to be used for transmitting the configured preamble groups. For example, the information on the preamble groups may include information of the first preamble group and information on the second preamble group. In addition, the information on the preamble groups may include information on member preambles included in the first preamble group and member preambles included in the second preamble group. In addition, according to the configuration information of the transmit powers to be used for transmitting the preamble groups, a first transmit power may be configured to the first preamble group, a second transmit power may be configured to the second preamble group, and the first transmit power may be greater than the second transmit power. In addition, the QoS information may include information indicating that the configured QoS levels consist of a QoS level 1 and a QoS level 2.

In addition, the QoS information may include a QoS threshold indicating a quality level required by each QoS level. For example, the QoS information may include a QoS threshold that a latency according to the QoS level 1 should be a latency less than 1 ms, and a QoS threshold that a latency according to the QoS level 2 is 1 ms or more. Alternatively, the QoS information may include a QoS specifier indicating a preamble group that can be selected based on the QoS threshold. Here, the QoS specifier may indicate that a preamble is selected from the second preamble group only when a required QoS is equal to or less than the QoS threshold, for example. Specifically, the QoS specifier may instruct to select a preamble from the second preamble group only when a required latency is equal to or less than the latency threshold. In this case, the latency threshold may be 1 ms. In this manner, the communication system may additionally configure the second preamble group to absorb the access demands of terminals attempting to access through the preamble groups A/B, and may expect the effect of more smoothly accessing through the groups A/B.

Then, each of the terminals may select preambles according to a required QoS based on the preamble group configuration information in the system information (S440). For example, when one terminal requests a latency of 1 ms or less as a required QoS, the terminal may select one preamble from the preambles belonging to the second preamble group.

Figure 6:
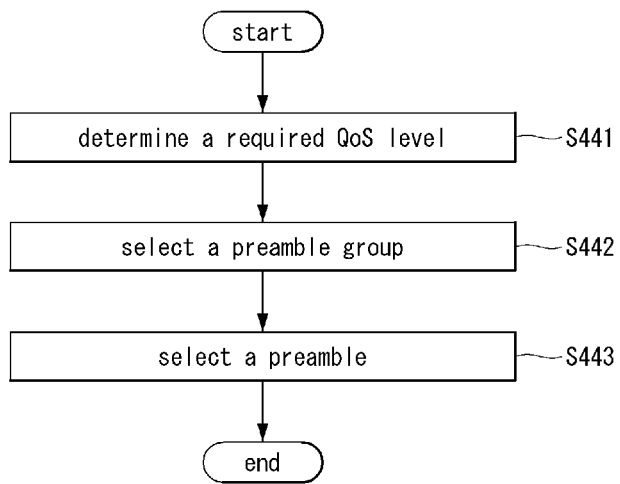
FIG. 6 is a flowchart illustrating a first exemplary embodiment of a procedure of selecting a preamble in FIG. 4.

FIG. 6 is a flowchart illustrating a first exemplary embodiment of a procedure of selecting a preamble in FIG. 4.

Referring to FIG. 6, in the preamble selection procedure, each of the terminals may determine whether its required QoS belongs to the QoS level 1 or the QoS level 2 based on the QoS information of the preamble group configuration information in the system information and/or the RRC message (S441). Thereafter, each of the terminals may select a preamble group according to the QoS level determined based on the QoS information (S442). For example, a terminal may select the first preamble group when its required QoS satisfies a QoS threshold of the QoS level 1. In contrast, a terminal may select the second preamble group when its required QoS satisfies a QoS threshold of the QoS level 2. Then, each of the terminals may arbitrarily select a preamble from the selected preamble group (S443).

Referring again to FIG. 4, the terminals may transmit the selected preambles to the base station (S450). In this case, the terminals may apply the first transmit power to the first preamble group and the second transmit power to the second preamble group according to the configuration information of the transmit powers, which was received from the base station. In this case, the terminals may be able to multiplex the preambles with a constant frequency and time interval. When the terminals transmit the preambles sufficiently spaced apart in frequency and time resource space, the base station may distinguish them through filtering. The 3GPP NR specification may express the divided resource space region as a random access channel (RACH) occasion, and may configure an arrangement thereof. The base station may transmit arrangement information of the RACH occasions to the terminals through system information and/or an RRC message. Then, the terminals may receive the arrangement information of the RACH occasions through the system information and/or the RRC message from the base station. The terminals may configure a RACH occasion bundle by bundling a plurality of adjacent RACH occasions in the resource space, and may utilize a coded random access technique by adding the number of occasions included in the RACH occasion bundle to the configuration information. The RACH occasion bundle may span the frequency and time domains. For example, it may be configured with four frequency division multiplexed occasions and two time division multiplexed occasions, and the same preamble may be repeatedly transmitted in all the adjacent eight RACH occasions. In this case, by muting the four RACH occasions at random by the terminals, the base station may easily receive them. Here, the terminals may configure a RACH occasion bundle and set the number of RACH occasions included in the RACH occasion bundle. However, in contrast to this, the base station may configure a RACH occasion bundle by bundling a plurality of adjacent RACH occasions in a resource space, and set the number of RACH occasions included in the RACH occasion bundle. The base station may transmit configuration information of the RACH occasion bundle and configuration information on the number of RACH occasions included in the RACH occasion bundle to the terminals. The terminals may receive the configuration information of the RACH occasion bundle and the configuration information on the number of RACH occasions included in the RACH occasion bundle from the base station. In addition, the terminals may configure RACH occasion bundles and configure the number of RACH occasion included in the RACH occasion bundle according to the configuration information of the RACH occasion bundle and the configuration information on the number of RACH occasions included in the RACH occasion bundle, which were received from the base station, and utilize a code random access technique.

Meanwhile, the terminals may use a discrete Fourier transform spread orthogonal frequency division multiplexing (DFT-S-OFDM) modulation scheme to cope with a multi-path fading channel. However, in order to facilitate analysis, it may be assumed that the terminals use a single-path fading channel, and a synchronization error of each terminal may not be considered. Meanwhile, the base station may receive the preambles transmitted by the terminals. In this case, if the preamble signals received by the base station are expressed as a received signal matrix Y, which is a matrix of M×N, it may be expressed as in Equation 6 below.

$$Y = \sum_{l=1}^{L_1} \sqrt{P_1}\, s_l c_l^H + \sum_{l=1}^{L_2} \sqrt{P_2}\, \bar{s}_l \bar{c}_l^H + N \in \mathbb{C}^{M \times N} \quad \text{[Equation 6]}$$

Here, M may be the number of receive antennas of the base station, N may be the length of the preamble. In addition, $s_l$ may represent a sum of radio channels from the terminals selecting a preamble index l in the first preamble group to the base station. In addition, $\bar{s}_l$ may represent a sum of radio channels from the terminals selecting the preamble l index in the second preamble group to the base station. In addition, $P_1$ may represent an average received power of the preambles selected from the first preamble group, and $P_2$ may represent an average received power of the preambles selected from the second preamble group. $P_1 > P_2$ may be assumed. Also, $c_l$ may be a preamble included in the first preamble group. Also, $\bar{c}_l$ may be a preamble included in the second preamble group. Meanwhile, N may mean a thermal noise matrix.

Figure 7:
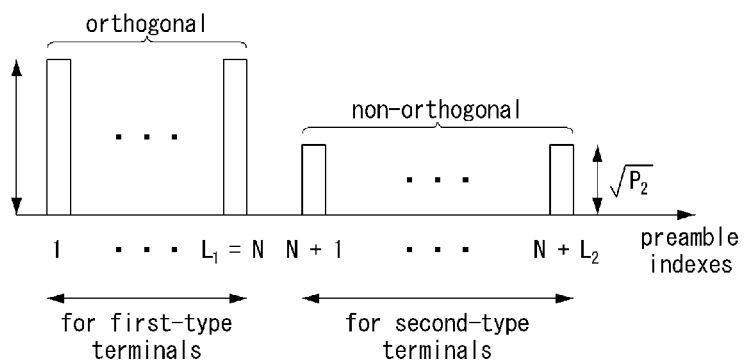
FIG. 7 is a conceptual diagram illustrating a first exemplary embodiment of preamble indices for each preamble group.

FIG. 7 is a conceptual diagram illustrating a first exemplary embodiment of preamble indices for each preamble group.

Referring to FIG. 7, among preamble indices for each preamble group, preamble indexes 1 to $L_1$ may indicate indices of preambles belonging to the first preamble group, and may be used for first-type terminals. Here, $L_1 = N$. In addition, N+1 to N+$L_2$ may indicate indexes of preambles belonging to the second preamble group, and may be used for second-type terminals. The preambles belonging to the first preamble group may be orthogonal to each other. In contrast, the preambles belonging to the second preamble group may not be orthogonal to each other. In addition, the preambles belonging to the first preamble group may be transmitted with a high transmit power, and the preambles belonging to the second preamble group may be transmitted with a lower transmit power than the preambles belonging to the first preamble group.

Meanwhile, the base station may extract the preambles transmitted by the terminals from the received signal matrix Y, and for this purpose, the base station may verify a total of $2^{L_1+L_2}$ hypotheses. As a result, it may be unreasonable for the base station to bear the computational complexity when the number of preambles increases exponentially. Accordingly, the base station may detect the preamble in two steps (S460).

Figure 8:
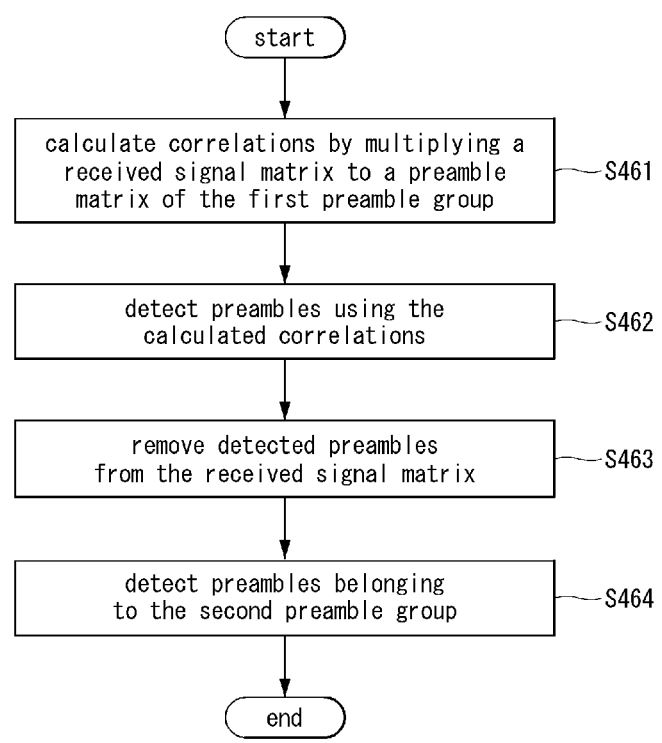
FIG. 8 is a flowchart illustrating a first exemplary embodiment of a procedure of detecting a preamble in FIG. 4.

FIG. 8 is a flowchart illustrating a first exemplary embodiment of a procedure of detecting a preamble in FIG. 4.

Referring to FIG. 8, in the preamble detection procedure, the base station may calculate correlations $g_l$ by multiplying the received signal matrix Y by the preamble matrix $c_l$ of the first preamble group as in Equation 7 (S461).

$$g_l = Y c_l \quad \text{[Equation 7]}$$
$$= \sqrt{P_1}\, s_l + \sqrt{P_2} \sum_{t=1}^{L_2} \bar{s}_t \bar{c}_t^h c_l + n_l, \, l = 1, \ldots, L_1$$

Thereafter, the base station may detect the preambles included in the first preamble group transmitted from the terminals using the calculated correlations (S462). In this case, since orthogonality exists between the preambles included in the first preamble group, interference therebetween may not exist. Contrary to this, although interference from the preambles belonging to the second preamble group may exist, since it may be assumed that the receive power is small, the deterioration of reception performance due to this may be considered small.

Thereafter, the base station may perform a successive interference cancellation (SIC) procedure on the received signal matrix Y to remove detected preambles belonging to the first preamble group as shown in Equation 8 below (S463).

$$Y = Y - \sum_{l \in \mathcal{J}_1} g_l c_l^H \quad \text{[Equation 8]}$$

$$Y P_1 = \left( \sum_{l=1}^{L_2} \sqrt{P_2}\, \bar{s}_l \bar{c}_l^H + N \right) P_1$$

Here, $\zeta_1$ may mean a set of indices of the preambles detected in the first preamble group. Also, in Equation 8, $P_1$ may be defined as in Equation 9 below using a unit matrix I.

$$P_1 = I - \sum_{i \in \mathcal{J}_1} c_i c_i^H \quad \text{[Equation 9]}$$

$P_1$ may mean an orthogonal projection matrix. If Equation 8 is rewritten using an orthogonal matrix C and a matrix $C_u$ consisting only of column vectors not detected in the orthogonal matrix C, it may be expressed as Equation 10 below.

$$C_u^H Y^H = (C_u^H C) \sqrt{P_2} [\bar{s}_1 \ldots \bar{s}_{L_2}]^H + C_u^H P_1^H N^H \quad \text{[Equation 10]}$$

Thereafter, the base station may detect preambles belonging to the second preamble group from the received signal matrix from which the detected preambles are removed (S464). In this case, if the number of terminals that have selected and transmitted the preambles belonging to the second preamble group is small, most of $\bar{s}_l$, $1 \leq l \leq L_2$ may be 0, and the preambles belonging to the second preamble group may be detected by obtaining a set of non-zero indexes l of $\bar{s}_l$. Since not only the thermal noise N but also the radio channel state $\bar{s}_l$ are random variables, variational inference on the set of transmitted preambles is required, and various algorithms for performing this are known. In particular, by applying a coordinated ascent variational inference (CAVI) algorithm, it is possible to detect the preambles belonging to the second preamble group in the received signal matrix with relatively low complexity by individually updating an activation probability for each preamble.

Referring again to FIG. 4, the base station may transmit preamble response signals according to the detected preambles to the terminals (S470).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving, from a base station, quality of service (QoS) information for preamble groups and information on preambles belonging to each of the preamble groups;
   selecting one preamble group from among the preamble groups based on the QoS information and a QoS of the terminal;
   selecting a preamble within the one preamble group based on the information on preambles belonging to each of the preamble groups;
   transmitting a first message including the selected preamble to the base station; and
   receiving, from the base station, a second message that is a response to the first message,
   wherein the preamble groups include a first preamble group for first-type terminals whose required latency is less than a threshold and a second preamble group for second-type terminals whose required latency is equal to or greater than the threshold.

2. The operation method according to claim 1, wherein the preamble groups include the first preamble group and the second preamble group generated by dividing an original preamble group consisting of constant amplitude zero autocorrelation (CAZAC) sequences having a prime sequence length based on cross-correlation, and a cross-correlation of preambles belonging to the first preamble group is smaller than a cross-correlation of preambles belonging to the second preamble group.

3. The operation method according to claim 2, wherein the CAZAC sequence is a Zadoff-Chu sequence, and the prime sequence length is one of 389 and 139.

4. The operation method according to claim 1, further comprising receiving information on transmit powers for the preamble groups, wherein the selected preamble is transmitted using a transmit power according to the information on the transmit powers.

5. The operation method according to claim 1, wherein a transmit power for the first preamble group is greater than a transmit power for the second preamble group.

6. The operation method according to claim 1, further comprising receiving, from the base station, configuration information of a random access channel (RACH) occasion bundle and a number of RACH occasions included in the RACH occasion bundle, wherein the selected preamble is transmitted in a RACH occasion indicated by the configuration information.

7. The operation method according to claim 1, wherein the first message is MsgA and the second message is MsgB.

8. An operation method of a base station in a communication system, the operation method comprising:
   configuring preamble groups, preambles belonging to each of the preamble groups, and a QoS of each of the preamble groups;
   transmitting preamble group configuration information to a terminal, the preamble group configuration information including information on the preamble groups, information on the preambles belonging to each of the preamble groups, and QoS information on the QoS of each of the preamble groups;
   receiving, from the terminal, a first message including a preamble selected based on the preamble group configuration information and a QoS of the terminal;
   detecting the preamble in the first message; and
   transmitting, to the terminal, a second message that is a response to the first message,
   wherein the preamble groups include a first preamble group for first-type terminals whose required latency is less than a threshold and a second preamble group for second-type terminals whose required latency is equal to or greater than the threshold.

9. The operation method according to claim 8, wherein the configuring comprises:
   generating an original preamble group having constant amplitude zero autocorrelation (CAZAC) sequences having a prime sequence length as member preambles;
   allocating the preambles in the original preamble group as the preambles belonging to the preamble groups; and
   configuring the QoS for each of the preamble groups.

10. The operation method according to claim 9, wherein the allocating of the preambles comprises:
    excluding preambles having a cross-correlation greater than or equal to a first threshold from the original preamble group;
    calculating cross-correlations of preambles remaining in the original preamble group; and
    allocating the remaining preambles to the preamble groups based on the calculated cross-correlations.

11. The operation method according to claim 9, wherein the configuring of the QoS for each of the preamble groups comprises:
    configuring QoS levels according to various QoS thresholds; and mapping the QoS level to each of the preamble groups.

12. The operation method according to claim 9, wherein the configuring of the QoS for each of the preamble groups comprises configuring the QoS for each of the preamble groups by using a QoS specifier(s) indicating a preamble group(s) that the base station is able to select.

13. The operation method according to claim 8, wherein the detecting of the preamble in the first message comprises:
  calculating cross-correlations by applying a preamble matrix of one preamble group to a received signal matrix of the first messages received from a plurality of terminals including the terminal;
  detecting preambles belonging to the one preamble group using the calculated cross-correlations;
  removing received signals corresponding to the detected preambles from the received signal matrix; and
  detecting the preamble in the first message by detecting preambles belonging to the remaining preamble groups in the received signal matrix from which the received signals are removed.

14. A terminal, the terminal comprising a processor, a memory electronically communicating with the processor, and instructions stored in the memory, wherein when executed by the processor, the instructions cause the terminal to:
  receive, from a base station, quality of service (QoS) information for preamble groups and information on preambles belonging to each of the preamble groups;
  select one preamble group from among the preamble groups based on the QoS information and a QoS of the terminal;
  select a preamble within the one preamble group based on the information on preambles belonging to each of the preamble groups;
  transmit a first message including the selected preamble to the base station; and
  receive, from the base station, a second message that is a response to the first message,
  wherein the preamble groups include a first preamble group for first-type terminals whose required latency is less than a threshold and a second preamble group for second-type terminals whose required latency is equal to or greater than the threshold.

15. The terminal according to claim 14, wherein the preamble groups include the first preamble group and the second preamble group generated by dividing an original preamble group consisting of constant amplitude zero auto-correlation (CAZAC) sequences having a prime sequence length based on cross-correlation, and a cross-correlation of preambles belonging to the first preamble group is smaller than a cross-correlation of preambles belonging to the second preamble group.

16. The terminal according to claim 14, wherein the instructions further cause the terminal to receive information on transmit powers for the preamble groups, wherein the selected preamble is transmitted using a transmit power according to the information on the transmit powers.

17. The terminal according to claim 14, wherein the instructions further cause the terminal to receive, from the base station, configuration information of a random access channel (RACH) occasion bundle and a number of RACH occasions included in the RACH occasion bundle, wherein the selected preamble is transmitted in a RACH occasion indicated by the configuration information.

* * * * *